US005135693A

United States Patent [19]

Hilbert et al.

[11] Patent Number: 5,135,693

[45] Date of Patent: Aug. 4, 1992

[54] PROCESS AND EQUIPMENT FOR THE CONTINUOUS PRODUCTION OF INORGANICALLY BONDED MATERIALS

[75] Inventors: Thomas Hilbert; Volker Thole, both of Braunschweig; Karsten Lempfer, Tonisvorst, all of Fed. Rep. of Germany

[73] Assignee: Fraunhofer-Gessellschaft zur Förderung der angewandten Forschung e.v., Munich, Fed. Rep. of Germany

[21] Appl. No.: 571,245

[22] Filed: Aug. 22, 1990

[30] Foreign Application Priority Data

Aug. 30, 1989 [DE] Fed. Rep. of Germany ....... 3928626

[51] Int. Cl.[5] ................ B29C 43/26

[52] U.S. Cl. ................ 264/120; 264/319; 425/335; 425/371

[58] Field of Search ............... 264/109, 120, 333, 319, 264/320; 425/371, 335; 106/731, 780; 156/39

[56] References Cited

U.S. PATENT DOCUMENTS 4,410,474 10/1983 Ahrweiler ........................ 264/109

4,784,816 11/1988 Sattler ........................ 264/210.2

FOREIGN PATENT DOCUMENTS 2247990 4/1974 Fed. Rep. of Germany ...... 425/371

*Primary Examiner*—Mary Lynn Theisen
*Attorney, Agent, or Firm*—Andrew N. Parfomak

[57] ABSTRACT

The present invention is directed to improvements in apparatus and processes for the continuous production of inorganically bonded materials, the apparatus and process providing a pressureless transition zone without the action of pressure on a continuous sheet of material arranged between a high-pressure compression unit and the calibrating unit, and where the calibrating unit is immediately preceded by a recompression unit, which applies an active pressure on the continuous sheet of material after it passes through the pressureless zone and before it enters the calibrating unit and where this active pressure is sufficiently high that the nominal thickness of the continuous sheet of material is equal to or less than the finished continuous sheet of material and nominal density of the continuous sheet of material are equal to or greater than the density of the finished continuous sheet of material.

8 Claims, 4 Drawing Sheets

PROCESS AND EQUIPMENT FOR THE CONTINUOUS PRODUCTION OF INORGANICALLY BONDED MATERIALS

BACKGROUND OF THE INVENTION AND DESCRIPTION OF THE PRIOR ART

The present invention pertains to a process and equipment for the continuous production of inorganically bonded materials.

One similar process is already known from DE-OS 34 41 839. The equipment and process described there for the continuous production of inorganically bonded materials require the presence of a high-pressure compression unit, followed immediately by a calibrating unit. The calibrating unit is directly connected to the high-pressure compression unit without a transition zone. This solution requires a special design. The use of available continuous high-pressure presses for overcompression is not possible, since the dimensions of the available high pressure presses do not allow the continuous sheet of material to pass directly into a calibrating unit. This is due, for example, to the necessary return of the roller carpet or roller chain (Siempelkamp Contiroll, Küsters Contipress), for which a sufficient amount of space is necessary. Accordingly, the equipment described in DE-OS 34 41 839 is not suitable for the available continuous high-pressure presses; it always requires a special design. This is a disadvantage because this solution is associate with high costs.

It is significantly easier and more cost-effective to use the available presses. However, as has already been explained, the use of presses that are already present requires a pressureless zone between the high-pressure compression unit and the calibrating unit. When the continuous sheet of material passes through this pressureless zone, the molding, which has been compressed to a thickness below its nominal thickness and to a density above its nominal density, springs back within this zone and cannot be transferred to the calibrating unit without active pressure application. The disadvantage of this is that the advantageous design of the equipment is lost, namely, the use of the relatively long calibrating unit without active pressure. This increases the cost of such equipment and reduces the economy of its use for the production of the material.

Furthermore, one of the problems associated with the continuous production of inorganically bonded particle board and especially fiberboard, especially at high nominal board density, is that the air contained in the fibrous material is compressed in the compression unit. When the molding is covered on both sides by shaping and conveyor belts during the entire period of (active or passive) pressure application, this compressed air can escape only through its edges. This results in splitting of the boards after they leave the press due, to the enclosed air. These conditions are disadvantageous.

OBJECTS OF THE INVENTION

Therefore, the goal of the invention was to develop equipment and a process, in which, even with a pressureless transition zone between the high-pressure compression unit and the calibrating unit, the calibrating unit ca be used without active pressure application.

SUMMARY OF THE INVENTION

The present invention provides a process and apparatus for the continuous production of inorganically bonded materials forming a continuous sheet of material in which the continuous sheet of material is compressed in a high-pressure compression unit with a pressure that is high enough that the thickness of the continuous sheet of material is below the nominal thickness of the finished board sheet and its density is above its nominal density, and no active pressure application occurs in the sizing unit that follows this compression unit, wherein the improvement comprises in that the continuous sheet of material, after leaving the high-pressure compression unit, passes through a pressureless zone, after which and immediately before entering a sizing unit, it is compressed to such an extent that the elastic recovery that occurred during passage through the pressureless zone is completely eliminated, and its density is greater than or equal to the nominal density of the finished board sheet, and its thickness is equal to or less than the nominal thickness of the finished board sheet upon entrance into the sizing unit.

DESCRIPTION OF THE PREFERRED EMBODIMENTS

The calibrating unit is immediately preceded by a recompression unit, in which the molding, which has experienced elastic recovery in the transition zone, is recompressed to its nominal thickness/nominal density or to a thickness below its nominal thickness and a density above its nominal density. Renewed active pressure application to recompress the molding at the beginning of the sizing phase makes it possible to increase the desired relaxation of the elastic forces or elastic stresses within the continuous sheet of material. This recompression of the continuous sheet of material requires much less compressive force than in the high-pressure compression unit. By positioning the recompression unit immediately before the calibrating unit, it is possible to utilize the relaxation behavior of the previously highly compressed continuous sheet of material, but, at the same time, to minimize the work that must be performed to produce high molding gross densities to prevent the continuous sheet of material from springing back above the desired thickness during the transition phase. If, during recompression, the molding is recompressed above its nominal density and below its nominal thickness, these elastic recovery stresses are further reduced. In this way, the sizing pressure to be applied in the calibrating unit without active pressure application is lower than it would be without a second overcompression. Due to the relaxation behavior of the molding, a second overcompression can reduce the length of time that pressure must be applied in the high-pressure compression unit and thus reduce the length and cost of the high-pressure compression unit without any significant increase in the required sizing pressure. By using a second overcompression in accordance with the invention, the application of nearly a line pressure is thus also sufficient in the high-pressure zone. If one were to utilize the advantage of a pressureless transition zone without the necessity of a recompression, the molding would have to be much more strongly overcompressed. This is not possible with the available continuous high-pressure presses or would be impossible in itself at high nominal gross densities of the material because the molding cannot be compressed beyond its net density.

In accordance with the invention, it is especially advantageous if the recompression unit applies a line pressure to the continuous sheet of material. Application of a line pressure e.g., by rolls of relatively large diameter) is especially easy to realize, and the costs of such a pressure unit are much lower than those of equipment that applies a surface pressure.

In accordance with one embodiment of the invention, it is especially advantageous if the recompression unit and the calibrating unit are enclosed by a common press band. This press band enclosing the recompression unit and the calibrating unit does not prevent the effect of air escape through the surface of the molding that occurs in the pressureless transition zone.

In accordance with another advantageous design of the equipment/process of the invention, the compression pressure of the recompression unit can be significantly lower than the compression pressure of the high-pressure compression unit. The compression pressure of the recompression unit must only overcome the elastic recovery of the already highly compressed molding; the greater the degree of high-pressure compression, the lower the necessary pressure of the recompression unit.

Another advantageous feature of the invention is that separation of the high-pressure compression unit and the recompression unit with the calibrating unit makes it possible to operate the two units at different speeds. The important thing is that the calibrating unit with the recompression unit can have a higher speed than the high-pressure compression unit at the beginning of the pressing process. The high-pressure compression of the continuous sheet of material increases the length of the sheet. If the high-pressure compression unit is positioned immediately before the calibrating unit, the two presses must operate at the same speed, and there is the danger of deformation of the continuous sheet of material in the calibrating unit. If the two units operate independently of each other, adjustment of the individual press speeds to the change in length of the continuous sheet of material is immediately possible.

The attached drawings illustrate a specific embodiment of the equipment of the invention.

Figure 1:
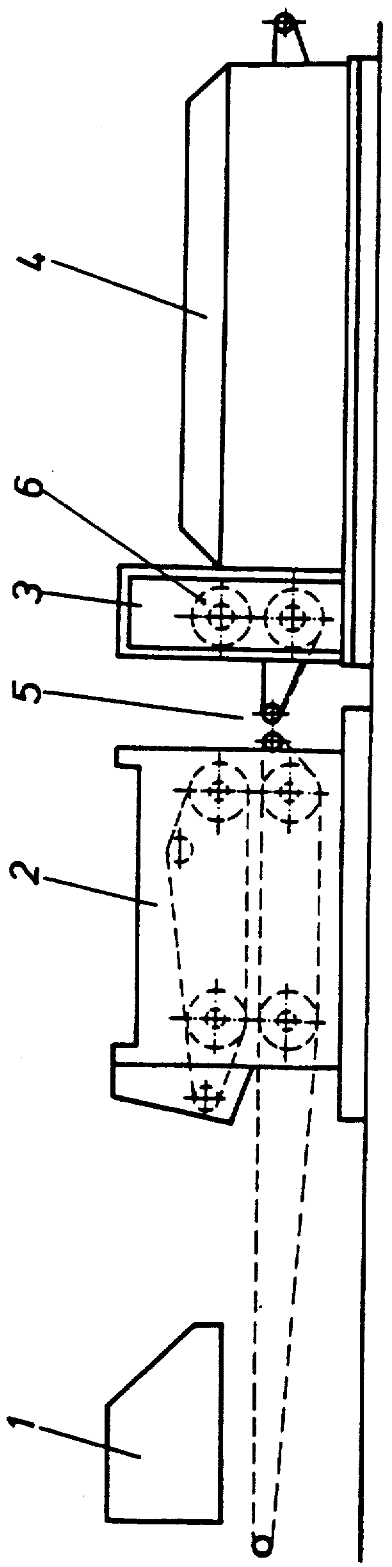
FIG. 1 shows a schematic drawing of the equipment for continuous production of inorganically bonded materials.

The equipment shown schematically in FIG. 1 comprises a spreading unit 1, a high-pressure compression press 2, a recompression unit 3 and a calibrating unit 4 also known as the sizing unit or sizing press. Between the high-pressure compression unit 2 and the recompression unit 3 there is a pressure-free zone 5. The recompression unit 3 has two rolls 6 that apply a line pressure to the molding. Although the production process is described below on the basis of one example, it is to be understood that further examples and embodiments consistent with the teachings of the present invention are contemplated and considered to form a part of the present invention.

The fibrous material spread on the conveyor belts by the spreading unit 1 first passes through the high-pressure press 2, which applied a surface pressure to the continuous sheet of material. The molding remains in the high-pressure press 2 for about 10 seconds and is compressed to about 14.6 mm at a predetermined nominal thickness of 16 mm. This high-pressure compression is performed with a specific compression pressure of 5 Newtons/mm$^2$. After leaving the high-pressure press 2, the molding passes through the pressure-free zone 5. The pressure-free time is about 25 seconds, and the length of the pressure-free zone 5 is about 5 meters. Elastic recovery of the molding starts to occur immediately after the molding leaves the high-pressure press 2. At the end of the pressure-free zone 5, as the molding enters the recompression unit 3, the molding has sprung back to a thickness of about 21.5 mm. In the recompression unit 3 a line pressure is applied to the molding by the rolls 6. A pressure of about 0.5 Newtons/mm$^2$ is necessary to achieve compression to the nominal thickness (16mm). After the molding has been recompressed to its nominal thickness, it enters the sizing press 4. In this example the molding was not overcompressed in the second pressing section (recompression unit), but rather was only compressed to its nominal thickness of 16 mm. It should be apparent nonetheless that other thicknesses could have been selected and acheived.

Figure 2:
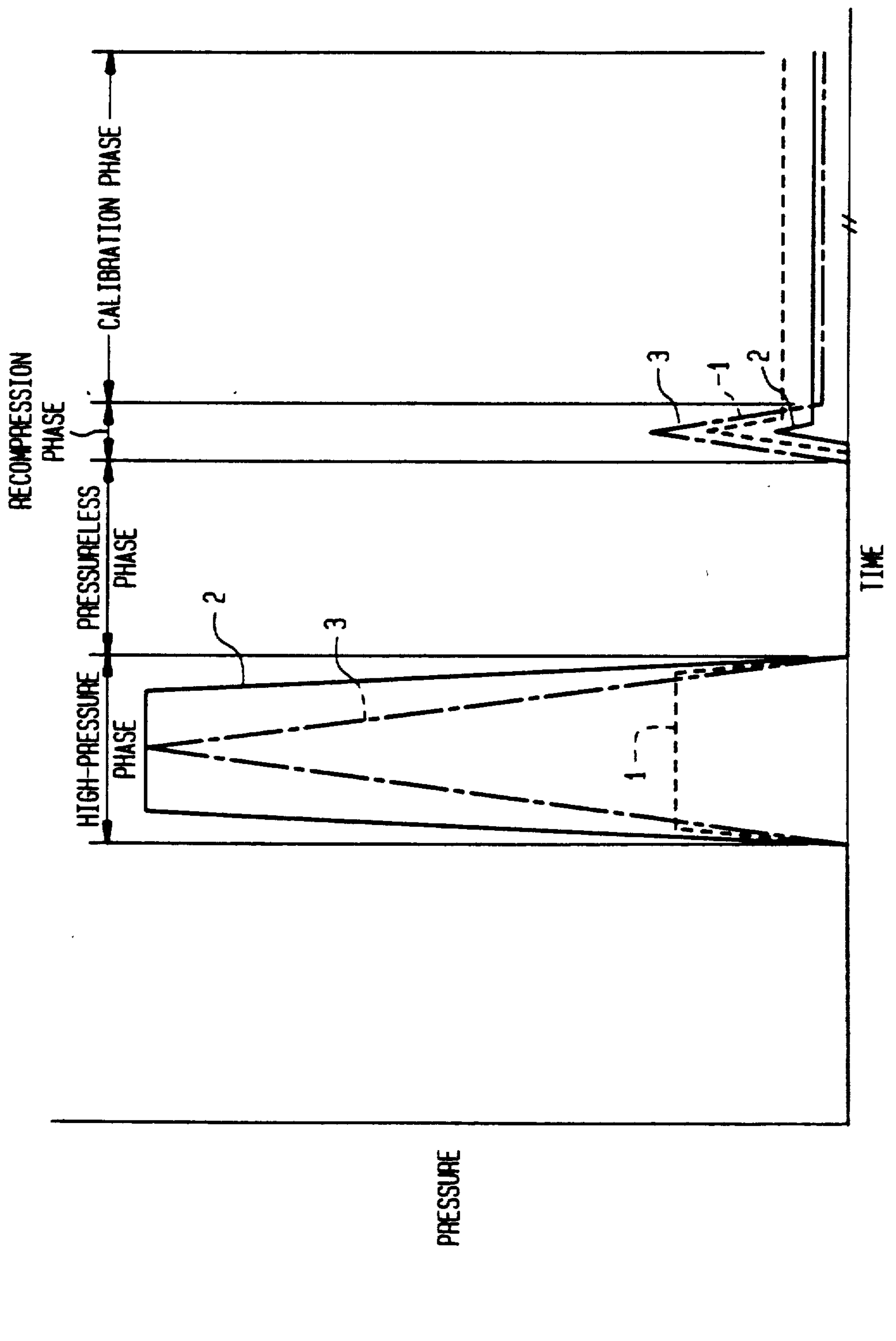
FIG. 2 shows the pressure as a function of time in the equipment without overcompression of the molding in the high-pressure compression unit (curve 1), with overcompression of the molding in the high-pressure compression unit (curve 2) and with brief overcompression of the molding in both the high-pressure compression unit and the recompression unit (curve 3).

FIG. 2 is a schematic representation of the compression pressure to be applied in the equipment as a function of time. A comparison of curves 1 and 2 shows that when the molding is overcompressed in the high-pressure compression unit 2, the pressure that must be applied by the recompression unit 3 is only about half as great as the pressure that must be applied without overcompression in the high-pressure compression unit. This means that the elastic recovery forces in the molding can be reduced by about 50% by overcompression. The sizing pressure to be applied without active pressure application in the calibrating unit 4 is also reduced by half compared to the example without overcompression (curve 2).

Figure 3:
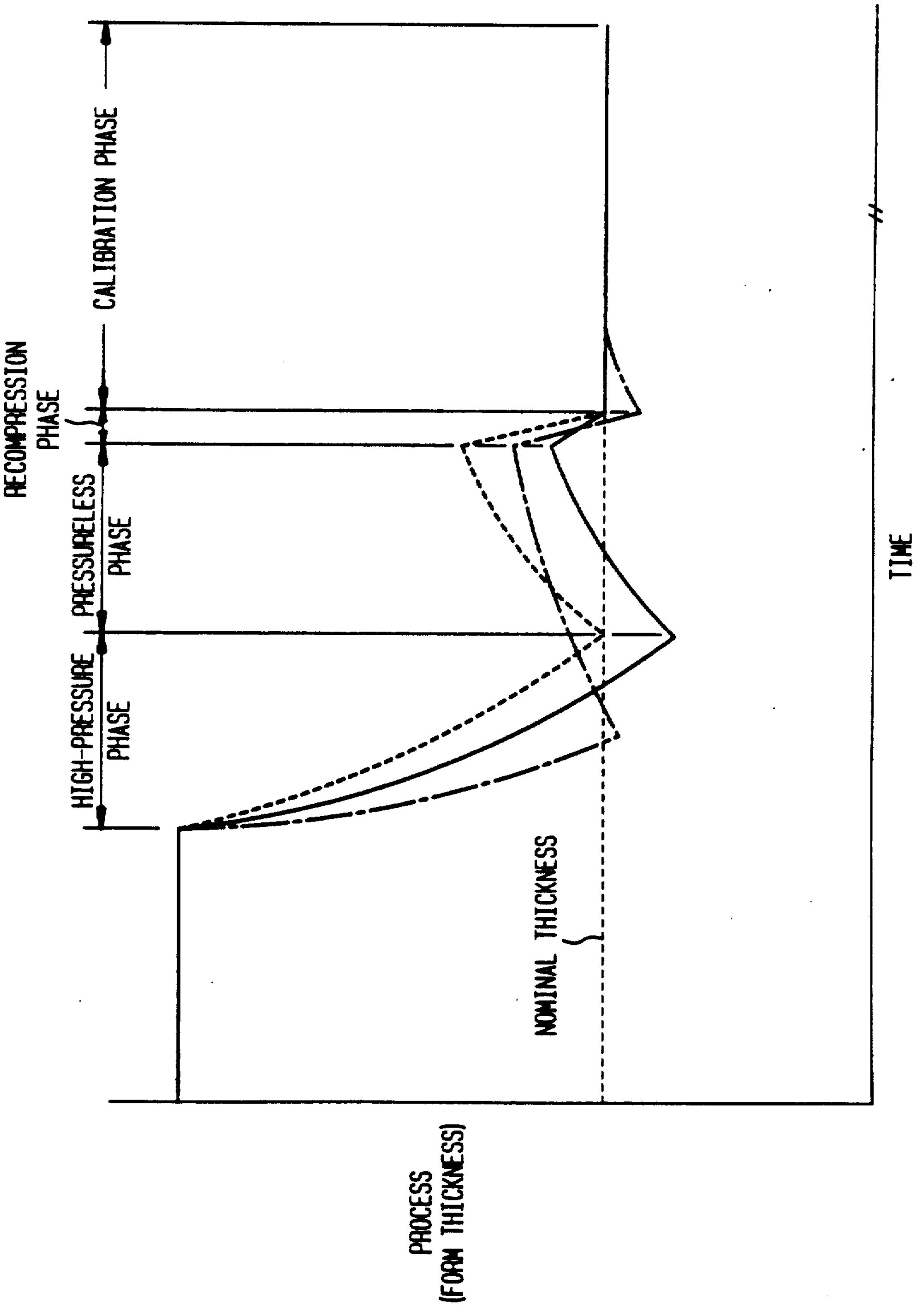
FIG. 3 shows the thickness of the molding as a function of time without overcompression of the molding in the high-pressure phase (curve 1), with overcompression of the molding in the high-pressure compression unit (curve 2), and with brief overcompression of the molding in both the high-pressure compression unit and the recompression unit (curve 3).

In the examples given above, after being overcompressed with a specific pressure of 5 Newtons/mm$^2$ (which corresponds to the maximum pressure that can be achieved with the available continuous high-pressure presses), the molding experiences elastic recovery to a thickness more than one third greater than the desired nominal thickness (FIG. 3, curve 2). Therefore, recompression is necessary before the molding enters the calibrating unit (4), which works without active pressure application.

FIG. 2, curve 3, is a schematic representation of the pressure behavior when a line pressure is applied to the continuous sheet of material in the high-pressure compression unit 2 and the continuous sheet of material is overcompressed in the recompression unit 3, also by line pressure. The corresponding behavior of the molding thickness is shown schematically in FIG. 3, curve 3.

Figure 4:
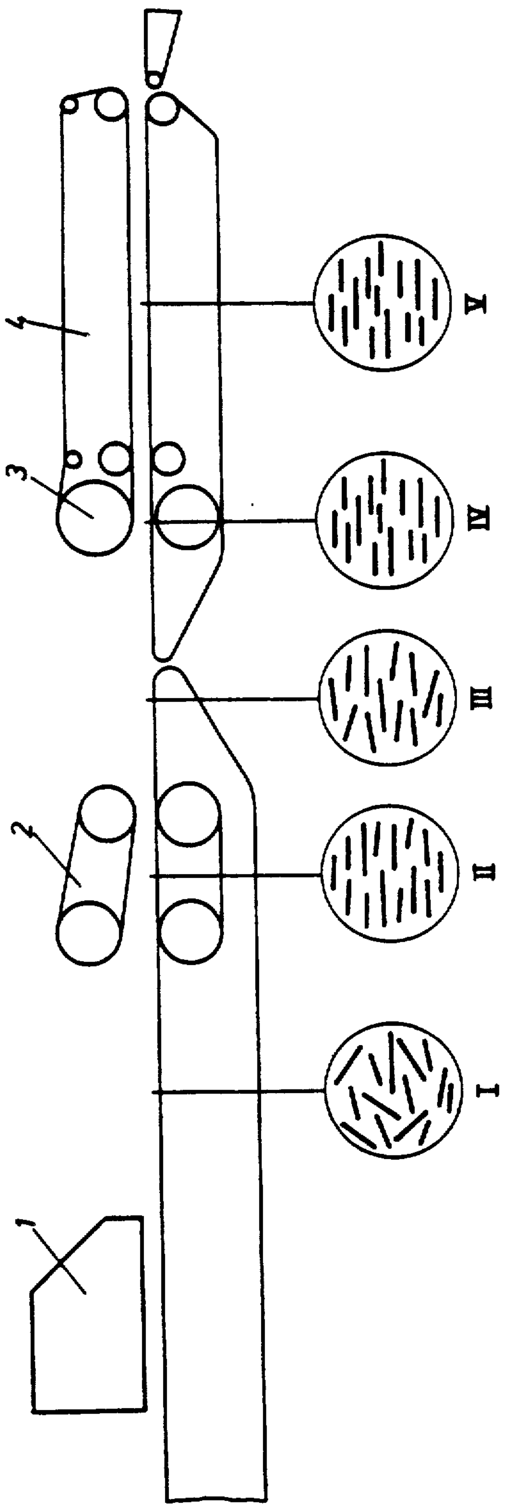
FIG. 4 shows a schematic representation of the position of the wood chips/fibers in the course of the production process.

FIG. 4 shows the position of the chips/fibers in the molding at various stages of the production process. After the spreading process, the chips are in a disordered state (I). In the high-pressure compression unit 2 they become ordered by the compression of the material and are brought into a position essentially parallel to the plane of the board (II). During passage through the pressure-free zone 5, the molding relaxes and the chips assume a partially ordered position (III). The recompression unit (3) forces the chips into their final position parallel to the plane of the board, and this position is then fixed in the sizing press 4. The boards produced in this way achieve maximum bending strength by virtue of this orientation of the chips (which exists over the entire cross section of the board).

We claim:

1. A process for the continuous production of inorganically bonded materials forming a continuous sheet of material in which the continuous sheet of material is compressed in a high-pressure compression unit with a pressure that is high enough that the thickness of the continuous sheet of material is below the nominal thickness of the finished board sheet and its density is above its nominal density, and no active pressure application occurs in the sizing unit that follows this compression unit, the improvement comprising in that the continuous sheet of material, after leaving the high-pressure compression unit (2), passes through a pressureless zone (5), after which and immediately before entering the sizing unit (4), it is compressed to such an extent that the elastic recovery that occurred during passage through the pressureless zone is completely eliminated, and its density is greater than or equal to the nominal density of the finished board sheet, and its thickness is equal to or less than the nominal thickness of the finished board sheet upon entrance into the sizing unit (4).

2. Equipment for the continuous production of inorganically bonded materials forming a continuous sheet of material which equipment includes a high-pressure compression unit (2) and a sizing unit (4) following the high-pressure compression unit (2), in which the continuous sheet of material is compressed with higher pressure than is necessary to achieve the nominal thickness and density of the finished continuous sheet of material, the improvement comprising in that a pressureless transition zone (5) without the action of pressure on the continuous sheet of material is arranged between the high-pressure compression unit (2) and the sizing unit (4), and the sizing unit (4) is immediately preceded by a recompression unit (3), which applies an active pressure on the continuous sheet of material after it passes through the pressureless zone (5) and before it enters the sizing unit (4), and that this active pressure is sufficiently high that the continuous sheet of material is compressed to a thickness which is equal to or less than the thickness of the finished continuous sheet of material, and is compressed to a density which is equal to or greater than the density of the finished continuous sheet of material.

3. The process in accordance with claim 1 wherein the continuous sheet of material, after leaving the high-pressure compression unit (2), passes through a pressureless zone (5), after which and immediately before entering the sizing unit (4), it is compressed by line pressure to such an extent that the elastic recovery that occurred during passage through the pressureless zone is completely eliminated, and its density is greater than or equal to the nominal density of the finished board sheet, and its thickness is equal to or less than the nominal thickness of the finished board sheet upon entrance into the sizing unit (4).

4. The process according to claim 1 wherein the pressure applied in the high-pressure compression unit (2) is a line pressure.

5. Equipment in accordance with claim 2, wherein the recompression unit (3) and the sizing unit (4) are enclosed by a common press band.

6. The process according to claim 1 wherein the pressure exerted upon the continuous sheet of material, after leaving the high-pressure compression unit (2) and after passing through the pressureless zone (5), and immediately before entering the sizing unit (4), is lower than that of the high-pressure compression unit (2).

7. The process according to claim 1 wherein the high-pressure compression unit (2) and of the recompression unit (3) with the sizing unit (4) operate at speeds which are different and independent of each other.

8. The process according to claim 1 wherein the inorganically bonded material is particle board of fiberboard.

* * * * *